US012574124B2

(12) United States Patent
Xiang et al.

(10) Patent No.: US 12,574,124 B2
(45) Date of Patent: Mar. 10, 2026

(54) ANTENNA CALIBRATION METHOD AND APPARATUS, AND REMOTE RADIO FREQUENCY UNIT

(71) Applicant: SANECHIPS TECHNOLOGY CO., LTD., Guangdong (CN)

(72) Inventors: Li Xiang, Guangdong (CN); Hongwang Cui, Guangdong (CN); Keyan Fan, Guangdong (CN); Yan Guo, Guangdong (CN); Long Wen, Guangdong (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 103 days.

(21) Appl. No.: 18/697,466

(22) PCT Filed: Mar. 21, 2022

(86) PCT No.: PCT/CN2022/081984
§ 371 (c)(1),
(2) Date: Mar. 30, 2024

(87) PCT Pub. No.: WO2023/050734
PCT Pub. Date: Apr. 6, 2023

(65) Prior Publication Data
US 2024/0405896 A1      Dec. 5, 2024

(30) Foreign Application Priority Data
Sep. 30, 2021     (CN) .......................... 202111164967.X

(51) Int. Cl.
*H04B 17/11*        (2015.01)
*H04B 17/21*        (2015.01)
(52) U.S. Cl.
CPC ............. *H04B 17/11* (2015.01); *H04B 17/21* (2015.01)

(58) Field of Classification Search
CPC ..................................................... H04B 17/11
See application file for complete search history.

(56) References Cited

U.S. PATENT DOCUMENTS

| 2006/0009162 A1* | 1/2006 | Tan ........................ H01Q 3/267 |
| | | 455/67.11 |
| 2016/0099762 A1* | 4/2016 | Wu ....................... H04B 7/0456 |
| | | 370/329 |

(Continued)

FOREIGN PATENT DOCUMENTS

| CN | 1446000 A | 10/2003 |
| CN | 102035076 A | 4/2011 |

(Continued)

OTHER PUBLICATIONS

WIPO, International Search Report issued on Jun. 29, 2022.
(Continued)

*Primary Examiner* — Jaison Joseph
(74) *Attorney, Agent, or Firm* — Li & Cai Intellectual Property (USA) Office

(57)        ABSTRACT

The present application provides an antenna calibration method and apparatus, and a remote radio unit. The method includes: generating a calibration sequence of a channel to be calibrated; determining, according to obtained calibration configuration information of the channel to be calibrated and an output sequence of the channel to be calibrated, a calibration response sequence of the channel to be calibrated; and calibrating the channel to be calibrated according to the calibration response sequence of the channel to be calibrated and the calibration sequence of the channel to be calibrated.

18 Claims, 5 Drawing Sheets

(56)                 References Cited

U.S. PATENT DOCUMENTS

| 2017/0012717 | A1  |         | 1/2017  | Song                  |
|--------------|-----|---------|---------|-----------------------|
| 2018/0288723 | A1  |         | 10/2018 | Cai                   |
| 2019/0058530 | A1  | *       | 2/2019  | Rainish ..... H04B 7/0617 |
| 2020/0076517 | A1  | *       | 3/2020  | Zhu ..... H01Q 3/267  |
| 2024/0405896 | A1  | *       | 12/2024 | Xiang ..... H04B 17/14 |

FOREIGN PATENT DOCUMENTS

| CN | 102404033 | A | 4/2012  |
|----|-----------|---|---------|
| CN | 107733536 | A | 2/2018  |
| CN | 108964795 | A | 12/2018 |
| CN | 110429993 | A | 11/2019 |

OTHER PUBLICATIONS

Magounaki, Theoni, et al: "Real-time Performance Evaluation of Relative Calibration on the OAI 5G testbed," 2019 53rd Asilomar Conference on Signals, Systems, and Computers, IEEE, Nov. 3, 2019.
European Patent Office, the Extended European Search Report dated Aug. 25, 2025, for corresponding EP application No. 22874136. 9.

* cited by examiner

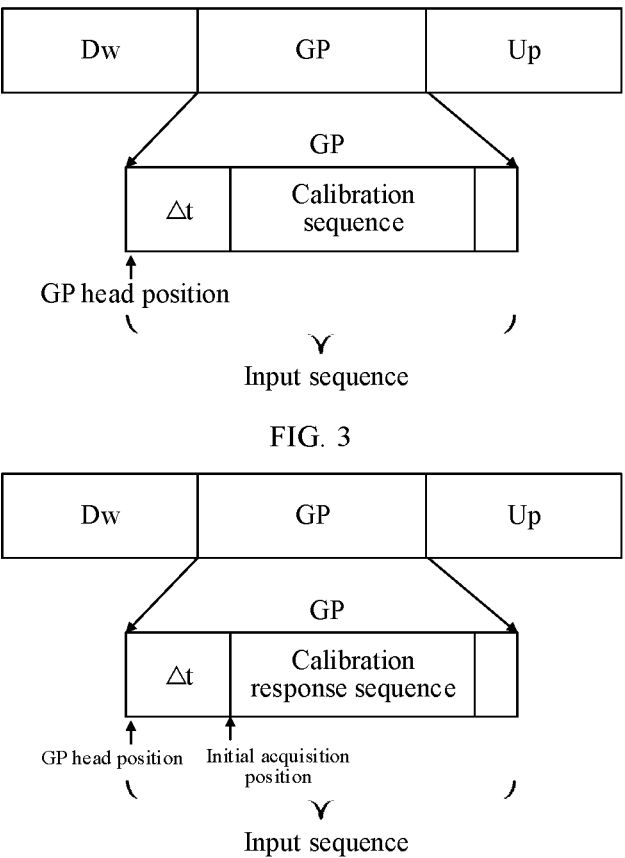

Generate a calibration sequence of a channel to be calibrated — S501

Determine, according to obtained calibration configuration information of the channel to be calibrated and an output sequence of the channel to be calibrated, a calibration response sequence of the channel to be calibrated — S502

Obtain a compensation coefficient for the channel to be calibrated according to the calibration response sequence of the channel to be calibrated and the calibration sequence of the channel to be calibrated — S503

Calibrate the channel to be calibrated according to the compensation coefficient for the channel to be calibrated — S504

FIG. 5

ANTENNA CALIBRATION METHOD AND APPARATUS, AND REMOTE RADIO FREQUENCY UNIT

CROSS-REFERENCE TO RELATED APPLICATIONS

This application is a National Phase application filed under 35 U.S.C. 371 as a national stage of PCT/CN2022/081984, filed on Mar. 21, 2022, an application claiming claims priority to Chinese patent application No. 202111164967.X filed on Sep. 30, 2021, the disclosure of which is hereby incorporated by reference in its entirety.

TECHNICAL FIELD

The present application relates to the field of communication technology, and particularly relates to an antenna calibration method and apparatus, and a remote radio unit.

BACKGROUND

An antenna can convert a guided wave propagating on a transmission line into an electromagnetic wave propagating in an unbounded medium, or vice versa. In practical applications, to enhance the directivity and field strength of the antenna radiation field, two or more antennae operating at the same frequency may be fed and spatially arranged according to certain requirements to form an antenna array. When using an antenna array, all antenna elements therein are desired to have consistent radio frequency channel characteristics. However, due to differences in actual parameters of radio frequency devices in different antenna elements, the antenna elements tend to have radio frequency channel characteristics which are not completely the same. Therefore, antenna calibration (AC) is desired to calibrate the radio frequency channels to ensure consistent channel characteristics of the radio frequency channels.

SUMMARY

The present application provides an antenna calibration method and apparatus, and a remote radio unit.

An embodiment of the present application provides an antenna calibration method, including: generating a calibration sequence of a channel to be calibrated: determining, according to obtained calibration configuration information of the channel to be calibrated and an output sequence of the channel to be calibrated, a calibration response sequence of the channel to be calibrated, wherein the output sequence of the channel to be calibrated is a sequence obtained through the channel to be calibrated in response to an input sequence; and calibrating the channel to be calibrated according to the calibration response sequence of the channel to be calibrated and the calibration sequence of the channel to be calibrated.

An embodiment of the present application provides an antenna calibration apparatus, including: a generation module configured to generate a calibration sequence of a channel to be calibrated: a determination module configured to determine, according to obtained calibration configuration information of the channel to be calibrated and an output sequence of the channel to be calibrated, a calibration response sequence of the channel to be calibrated, wherein the output sequence of the channel to be calibrated is a sequence obtained through the channel to be calibrated in response to an input sequence of the channel to be calibrated; and a calibration module configured to calibrate the channel to be calibrated according to the calibration response sequence of the channel to be calibrated and the calibration sequence of the channel to be calibrated.

An embodiment of the present application provides a remote radio unit (RRU), including: any antenna calibration apparatus according to at least one embodiment of the present application.

An embodiment of the present application provides an antenna calibration system, including: a remote radio unit and an antenna: wherein the remote radio unit adopts any remote radio unit provided in the embodiments of the present application: the antenna includes a plurality of channels to be calibrated.

An embodiment of the present application provides an electronic device, including: one or more processors; and a memory having one or more programs stored thereon which, when executed by the one or more processors, cause the one or more processors to implement any antenna calibration method described in the embodiments of the present application.

An embodiment of the present application further provides a computer-readable storage medium having a computer program stored thereon which, when executed by a processor, causes any antenna calibration method described in the embodiments of the present application to be implemented.

With respect to the above embodiments and other aspects of the present application and implementations thereof, further description is provided in the brief description of drawings, the detailed description of embodiments, and the claims.

BRIEF DESCRIPTION OF DRAWINGS

FIG. 3 shows a schematic diagram of an input sequence according to an embodiment of the present application.

FIG. 4 shows a schematic diagram of a calibration response sequence according to an embodiment of the present application.

FIG. 5 shows a schematic flowchart of an antenna calibration method according to yet another embodiment of the present application.

DETAIL DESCRIPTION OF EMBODIMENTS

Figure 1:
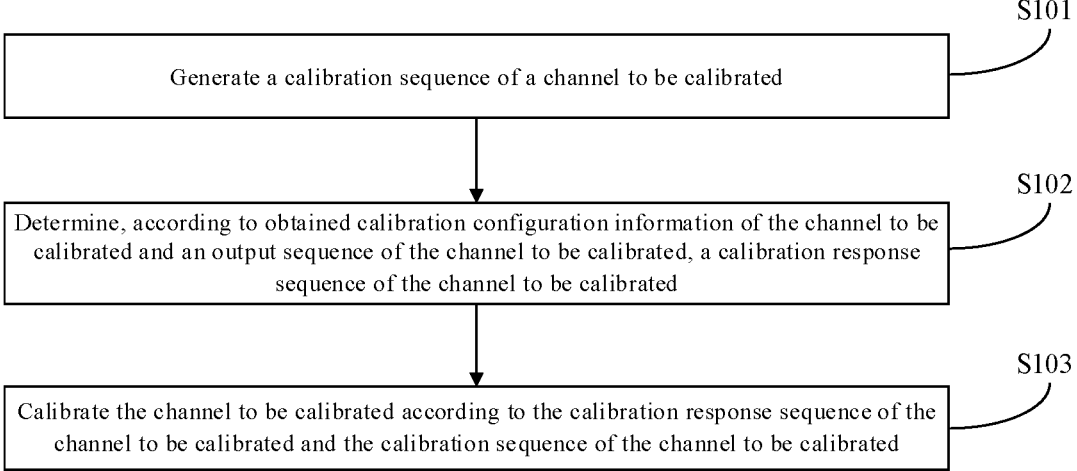
FIG. 1 shows a schematic flowchart of an antenna calibration method according to an embodiment of the present application.

For clarity and better understanding of the objects, technical solution and advantages of the application, embodiments of the present application will now be described in detail in conjunction with the accompanying drawings. It should be noted that the embodiments of the present application and features/implementations therein may be combined with each other in any manner as long as they are not contradictory.

Currently, antenna calibration can be implemented by a base station or a base band unit (BBU). In the existing art, for example, the base station generates a calibration signal according to available time-frequency resources, and transmits the calibration signal to a calibration processing module by a radio frequency transceiver module and a calibration radio frequency transceiver module, and then, the calibration processing module obtains a calibration coefficient according to a received response signal, and performs antenna calibration according to the calibration coefficient. For another example, the BBU generates calibration control information and a calibration sequence, and sends the calibration control information and the calibration sequence to a remote radio unit (RRU) of the base station through a downlink subframe: the RRU receives the calibration control information and the calibration sequence on the downlink subframe, determines a calibration type (i.e., transmitting calibration or receiving calibration) according to the calibration control information, performs corresponding antenna calibration using the calibration sequence according to the calibration type to obtain calibration data, and sends the calibration data to the BBU through an uplink subframe; and the BBU obtains the calibration data from the uplink subframe, calculates a calibration coefficient from the calibration data, and performs calibration and adjustment on received signals or transmission signals according to the calibration coefficient.

In the above antenna calibration scheme, there is a lot of interaction between systems or functional modules, making joint debugging difficult. Moreover, the calibration processing module or RRU lacks indication information when acquiring response signals (sequences) from the received signals, resulting in inaccurate response signals (sequences) and thus affecting the accuracy of antenna calibration.

In view of the above, an embodiment of the present application provides an antenna calibration method, in which an antenna calibration apparatus in an RRU directly generates a calibration sequence, and acquires, according to obtained calibration configuration information of a channel to be calibrated, a calibration response sequence from an output sequence of the channel to be calibrated, and calibrates the channel to be calibrated according to the calibration response sequence of the channel to be calibrated and the calibration sequence of the channel to be calibrated. Therefore, it is not necessary to obtain the calibration sequence from other systems or functional modules, thereby reducing interactive operations and complexity of the calibration procedure, while a more accurate calibration response sequence can be obtained, which can effectively improve the calibration accuracy of the channel to be calibrated.

FIG. 1 shows a schematic flowchart of an antenna calibration method according to an embodiment of the present application. The antenna calibration method may be applied to an antenna calibration apparatus, and the antenna calibration apparatus may be provided in a RRU. As shown in FIG. 1, the antenna calibration method in the embodiment of the present application may include the following operations S101 to S103.

At operation S101, generating a calibration sequence of a channel to be calibrated.

The channel to be calibrated is at least one channel to be calibrated in the antenna, which may be a transmitting channel or a receiving channel. The calibration sequence is a sequence used for channel calibration.

In some implementations, the antenna calibration apparatus generates a sequence with good white noise resistance according to a preset algorithm, and uses it as the calibration sequence.

In some other implementations, the antenna calibration apparatus generates an original sequence according to a preset algorithm, and performs periodic cyclic shift on the original sequence to form the calibration sequence.

Compared with the existing art in which the calibration sequence is generated by the base station or the BBU, and is sent to the RRU or a calibration processing module at the base station side for antenna calibration, this embodiment involves directly generating a calibration sequence and performing antenna calibration by an antenna calibration apparatus, which can effectively reduce interactive operations between different systems or functional modules in the antenna calibration process, and thus simplify the antenna calibration procedure.

At operation S102, determining, according to obtained calibration configuration information of the channel to be calibrated and an output sequence of the channel to be calibrated, a calibration response sequence of the channel to be calibrated.

The calibration configuration information of the channel to be calibrated includes phase information of a guard period (GP), and delay information. The phase information of the GP is used to characterize an interval between a head position of the GP and a header of a data frame, and the delay information is used to characterize an interval between the calibration sequence of the channel to be calibrated and the head position of the GP. The output sequence is a sequence obtained through the channel to be calibrated in response to an input sequence of the channel to be calibrated, and the calibration response sequence is a sequence obtained through the channel to be calibrated in response to the calibration sequence of the channel to be calibrated.

In some implementations, a signal processing apparatus inserts the calibration sequence into the GP of the data frame to obtain the input sequence. When determining the calibration response sequence of the channel to be calibrated, the antenna calibration apparatus determines the output sequence from the GP of the data frame according to the obtained calibration configuration information of the channel to be calibrated, and acquires, from the output sequence, a sequence generated through the channel to be calibrated in response to the calibration sequence, to obtain the calibration response sequence. The signal processing apparatus is an apparatus having a signal processing function.

By inserting the calibration sequence in the GP and transmitting the input sequence, the input sequence and service signals transmitted over the antenna are staggered in the time domain, so that the antenna calibration can be performed without interfering with normal service communication.

At operation S103, calibrating the channel to be calibrated according to the calibration response sequence of the channel to be calibrated and the calibration sequence of the channel to be calibrated.

The purpose of calibrating each channel to be calibrated is to ensure that all channels have consistent channel characteristics. For example, through calibration, the respective channels would have consistent phase, amplitude, time delay, and other channel characteristics.

In some implementations, calibrating the channel to be calibrated according to the calibration response sequence of the channel to be calibrated and the calibration sequence of the channel to be calibrated includes: obtaining a compensation coefficient for the channel to be calibrated according to the calibration response sequence of the channel to be calibrated and the calibration sequence of the channel to be calibrated; and calibrating the channel to be calibrated according to the compensation coefficient for the channel to be calibrated. The compensation coefficient is used for compensating the transmitted or received signal when the channels transmit and receive data after the calibration, so that all the channels have consistent channel characteristics.

In this embodiment, first, a calibration sequence of the channel to be calibrated is generated, so that it is not necessary to obtain the calibration sequence through other functional entities, which can reduce interaction with other functional entities and simplify the calibration procedure; and then, according to the obtained calibration configuration information of the channel to be calibrated and an output sequence of the channel to be calibrated, a calibration response sequence of the channel to be calibrated with higher accuracy can be obtained: therefore, when calibrating the channel to be calibrated according to the calibration response sequence of the channel to be calibrated and the calibration sequence of the channel to be calibrated, the calibration accuracy of the channel to be calibrated can be effectively improved, and thereby the overall calibration accuracy of the antenna is improved.

It should be noted that, in the embodiments of the present application, since the channel to be calibrated may either be a transmitting channel or a receiving channel, the antenna calibration method provided in this embodiment may be used for both uplink calibration and downlink calibration.

Under the condition that the channel to be calibrated is transmitting channels, downlink calibration is implemented. Specifically, the antenna calibration apparatus generates a calibration sequence, and the signal processing apparatus generates an input sequence according to the calibration sequence, and sends the input sequence of the channel to be calibrated to each channel to be calibrated (transmitting channel). The respective channels to be calibrated receive and transmit the input sequence of the channel to be calibrated, and send output sequences of the channels to be calibrated to a standard receiving channel through a coupling loop. The antenna calibration apparatus obtains the output sequence of each channel to be calibrated from the standard receiving channel, and performs antenna calibration.

Under the condition that the channel to be calibrated is receiving channels, uplink calibration is implemented. Specifically, the antenna calibration apparatus generates a calibration sequence, and the signal processing apparatus generates an input sequence according to the calibration sequence, and sends the input sequence of the channel to be calibrated to a standard transmitting channel, the standard transmitting channel sends the input sequence of the channel to be calibrated to the channels to be calibrated through a splitter, and the channels to be calibrated receive and transmit the input sequence of the channel to be calibrated, and therefore the output sequence of each channel to be calibrated is obtained. The antenna calibration apparatus obtains the output sequences from the channels to be calibrated, and performs antenna calibration.

The standard receiving channel is a channel arbitrarily selected from the receiving channels, and is recovered to a normal receiving channel in the uplink calibration. Similarly, the standard transmitting channel is a channel arbitrarily selected from the transmitting channels, and is recovered to a normal transmitting channel in the downlink calibration. By performing the antenna calibration in a multiplexing channel mode, it is not necessary to provide an additional dedicated calibration channel, which can reduce the antenna cost to a certain extent, and result in a higher operation flexibility.

Figure 2:
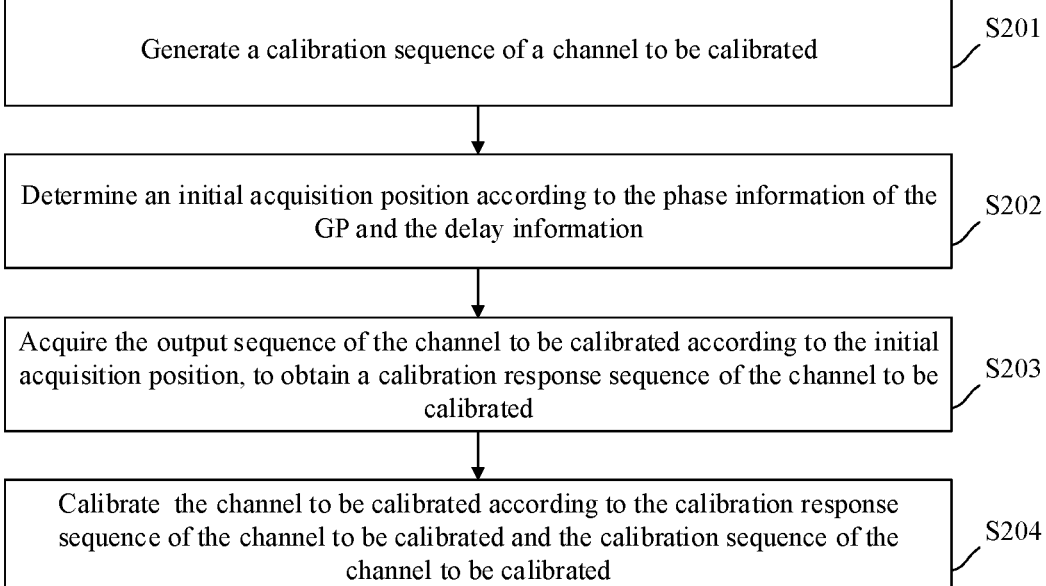
FIG. 2 shows a schematic flowchart of an antenna calibration method according to another embodiment of the present application.

FIG. 2 shows a schematic flowchart of an antenna calibration method according to another embodiment of the present application. The antenna calibration method may be applied to an antenna calibration apparatus provided in a RRU. As shown in FIG. 2, the antenna calibration method in the embodiment of the present application may include the following operations S201 to S204.

At operation S201, generating a calibration sequence of a channel to be calibrated.

The operation S201 in this embodiment is the same as the operation S101 in the above embodiment of the present application, and thus is not repeated here.

In some implementations, after generating the calibration sequence of the channel to be calibrated, the antenna calibration apparatus sends the calibration sequence to the signal processing apparatus. According to preset delay configuration information, the signal processing apparatus inserts the calibration sequence of the channel to be calibrated into a guard period (GP) of a data frame to obtain the input sequence of the channel to be calibrated. The GP is a special slot between a downlink slot (Dw) and an uplink slot (Up) of the data frame, and the preset delay configuration information is used for determining an insertion position of the calibration sequence of the channel to be calibrated in the GP. The signal processing apparatus is an apparatus having a signal processing function, which may be an apparatus located inside an antenna transmitting channel, or an apparatus independent of the antenna transmitting channel, which are not limited in the present application.

FIG. 3 shows a schematic diagram of an input sequence. As shown in FIG. 3, a data frame includes a downlink slot Dw, a guard period GP, and an uplink slot Up. The signal processing apparatus determines, according to preset delay configuration information, position information of the GP (used for determining a distance between a GP head position and a data frame header, or characterizing a sequence number of the GP in the data frame), and a time delay value $\Delta t$ (that is to say, the time delay is configurable). Therefore, the calibration sequence is inserted at a position where the GP is $\Delta t$ away from the GP head position, and the input sequence of the channel to be calibrated is obtained.

In practical applications, to insert the calibration sequence, the position of the GP or a phase of the GP may be determined according to an edge signal of the GP. For example, after determining that the calibration sequence is to be inserted into an $i^{th}$ GP of the data frame, the signal processing apparatus may determine the position of the GP according to a falling edge signal of the $i^{th}$ GP, and then inserts the calibration sequence into the GP according to the time delay value $\Delta t$, where i represents a sequence number of the GP in the data frame, and i is an integer greater than or equal to 1.

After the signal processing apparatus generates the input sequence, the channel to be calibrated receives and transmits the input sequence to obtain an output sequence thereof. The output sequence of the channel to be calibrated includes two parts, where one part is a response of the channel to be calibrated to the time delay value $\Delta t$, and the other part is a response of the channel to be calibrated to the calibration sequence (i.e., the calibration response sequence). If the output sequence of the channel to be calibrated is directly used as the calibration response sequence, it will result in significant errors, thus affecting the accuracy of antenna calibration. Therefore, the antenna calibration apparatus should clarify the position information of the calibration response sequence in the output sequence, so that the calibration response sequence can be accurately acquired from the output sequence of the channel to be calibrated.

In some implementations, the time delay value may be configured by the antenna calibration apparatus. A downlink data insertion module (i.e., a functional module for inserting the calibration sequence into the GP) inserts the calibration sequence into the GP according to the time delay value and the phase information of the GP, and transmits the phase information of the GP to an uplink receiving module, so that the antenna calibration apparatus obtains the phase information of the GP through the uplink receiving module, and performs antenna calibration in conjunction with the time delay value.

At operation S202, determining an initial acquisition position according to the phase information of the GP and the delay information.

The initial acquisition position corresponds to a start position of the calibration response sequence in the GP.

In some implementations, the antenna calibration apparatus firstly determines a head position of the GP in the data frame according to the phase information of the GP, and then determines a distance between the calibration response sequence and the GP head position according to the delay information, thereby determining the initial acquisition position.

At operation S203, acquiring the output sequence of the channel to be calibrated according to the initial acquisition position, to obtain a calibration response sequence of the channel to be calibrated.

After determining the initial acquisition position, the antenna calibration apparatus can accurately acquire a calibration response sequence of the channel to be calibrated from the output sequence of the channel to be calibrated.

FIG. 4 shows a schematic diagram of a calibration response sequence. As shown in FIG. 4, the calibration response sequence is located within a GP of a data frame. The antenna calibration apparatus firstly determines a head position of the GP according to the phase information of the GP, and then determines a distance $\Delta t$ between the calibration response sequence and the GP head position according to the delay information, thereby determining an initial acquisition position (i.e., with an addressable time delay), and acquiring the calibration response sequence from the input sequence according to the initial acquisition position.

In this embodiment, by setting the time delay value $\Delta t$ and inserting the calibration sequence into the GP according to $\Delta t$, influences of the calibration sequence or the calibration response sequence on service signals transmitted in the downlink slot Dw and the uplink slot Up can be prevented, thereby ensuring normal operation of the service.

In some implementations, after being acquired, the acquired calibration response sequence may be stored in a preset storage space. When the calibration response sequence and the calibration sequence are used for calibration, the calibration response sequence can be obtained from the preset storage space.

At operation S204, calibrating the channel to be calibrated according to the calibration response sequence of the channel to be calibrated and the calibration sequence of the channel to be calibrated.

The operation S204 in this embodiment is the same as the operation S103 in the above embodiment of the present application, and thus is not repeated here.

In this embodiment, a calibration sequence of the channel to be calibrated is firstly generated, so that it is not necessary to obtain the calibration sequence through other functional entities, which can reduce interaction with other functional entities and simplify the calibration procedure: according to the phase information of the GP and the delay information, the position information of the calibration response sequence in the output sequence can be accurately determined, thereby an accurate initial acquisition position can be determined; and the output sequence of the channel to be calibrated is acquired according to the initial acquisition position, so that a calibration response sequence of the channel to be calibrated with higher accuracy can be obtained. Therefore, when calibrating the channel to be calibrated according to the calibration response sequence of the channel to be calibrated and the calibration sequence of the channel to be calibrated, the calibration accuracy of the channel to be calibrated can be effectively improved, and thereby the overall calibration accuracy of the antenna is improved.

It should be noted that, in some implementations, before the operation S202 of determining the initial acquisition position according to the phase information of the GP and the delay information, the antenna calibration method further includes: separating, under the condition that the channel to be calibrated is transmitting channels of an antenna, the output sequence of each channel to be calibrated from a mixed sequence. The mixed sequence is a sequence set which is received by a standard receiving channel and includes output sequences of a plurality of channels to be calibrated.

It should be further noted that, considering that in the signal (sequence) acquisition process, a receiver with a constant gain may not correctly demodulate signals due to relatively great changes in the signal strength, a variable gain amplifier (VGA) may be used to adjust the gain of signals, thereby ensuring proper demodulation.

In some implementations, after the operation S202 of determining the initial acquisition position according to the phase information of the GP and the delay information, the antenna calibration method further includes: obtaining, under the condition of obtaining the output sequence of the channel to be calibrated according to the initial acquisition position, information of an attenuation factor of a variable gain amplifier (VGA) at an acquisition moment; and suspending, under the condition that the VGA is determined to be abnormal according to the information of the attenuation factor, an acquisition operation on the output sequence of the channel to be calibrated; and acquiring, under the condition that the VGA is determined to be recovered to normal, the output sequence of the channel to be calibrated again according to the calibration configuration information of the channel to be calibrated.

Through the detection of the VGA attenuation factor information in the sequence acquisition process, the calibration response sequence can be prevented from being acquired when the VGA has a fault, such as abnormal attenuation, thereby ensuring the accuracy of the acquired calibration response sequence, and improving the calibration accuracy of the antenna.

Further, in practical applications, there is a certain time delay in the detection of the attenuation factor information. When this time delay is inconsistent with the time delay in acquiring the calibration response sequence, it may lead to a situation in which abnormality in the VGA already occurs at a certain moment, but the calibration response sequence acquired during the abnormal period (since that abnormal moment) is still mistaken for a normal sequence, leading to an inaccurate acquisition result. In view of this, in some implementations, after obtaining, under the condition of obtaining the output sequence of the channel to be calibrated according to the initial acquisition position, information of the attenuation factor of the VGA at the acquisition moment, the antenna calibration method further includes: storing into a preset storage space the information of the attenuation factor, as well as the calibration response sequence of the channel to be calibrated acquired at the acquisition moment and corresponding to the information of the attenuation factor.

By pre-storing the information of the attenuation factor and the corresponding calibration response sequence, an accurate correspondence relationship between the calibration response sequence and the VGA attenuation factor information can be guaranteed, and the problem of the inaccurate acquisition result caused by the time delay can be avoided.

In some implementations, after suspending, under the condition that the VGA is determined to be abnormal according to the information of the attenuation factor, the acquisition operation on the output sequence of the channel to be calibrated, the antenna calibration method further includes: determining, according to the information of the attenuation factor, a calibration response sequence of the channel to be calibrated acquired during a period when the VGA is abnormal; and setting the calibration response sequence of the channel to be calibrated acquired during the period when the VGA is abnormal in the preset storage space to an invalid state.

By setting the calibration response sequence of the channel to be calibrated acquired during the period when the VGA is abnormal and stored in the preset storage space to an invalid state, state information of the calibration response sequence can be effectively prompted to the antenna calibration apparatus, so that the antenna calibration apparatus will not obtain the calibration response sequence in the invalid state from the preset storage space.

It should be noted that during calibration, the antenna calibration apparatus may directly use the acquired calibration response sequence, or may obtain the calibration response sequence from the preset storage space, which are not limited in the present application. When the calibration response sequence is obtained from the preset storage space, the antenna calibration apparatus may obtain, according to the state information, only calibration response sequences other than those in the invalid state, which are acquired and stored under the normal condition of the VGA and can be used in calibration to guarantee the calibration accuracy.

FIG. 5 shows a schematic flowchart of an antenna calibration method according to yet another embodiment of the present application. The antenna calibration method may be applied to an antenna calibration apparatus provided in a RRU. As shown in FIG. 5, the antenna calibration method in the embodiment of the present application may include the following operations S501 to S504.

At operation S501, generating a calibration sequence of a channel to be calibrated.

At operation S502, determining, according to obtained calibration configuration information of the channel to be calibrated and an output sequence of the channel to be calibrated, a calibration response sequence of the channel to be calibrated.

The operations S501 to S502 in this embodiment are the same as the operations S101 to S102 in the above embodiment of the present application, and thus are not repeated here.

At operation S503, obtaining a compensation coefficient for the channel to be calibrated according to the calibration response sequence of the channel to be calibrated and the calibration sequence of the channel to be calibrated.

In some implementations, channel estimation is firstly performed on the channel to be calibrated according to the calibration response sequence of the channel to be calibrated and the calibration sequence of the channel to be calibrated, to obtain impact response information of the channel to be calibrated: then an antenna weight of the channel to be calibrated is obtained according to the impact response information of the channel to be calibrated; and finally, a compensation coefficient for the channel to be calibrated is determined according to the antenna weight of the channel to be calibrated and an antenna weight of a preset standard reference channel. The antenna weight is related to parameters such as an amplitude, a phase and a time delay of the channel to be calibrated, and the preset standard reference channel is a channel selected from a plurality of channels to be calibrated.

In some other implementations, the calibration sequence is a periodic sequence, and the calibration response sequence is a periodic sequence having the same period as the calibration sequence. Obtaining the compensation coefficient for the channel to be calibrated according to the calibration response sequence of the channel to be calibrated and the calibration sequence of the channel to be calibrated includes: calculating a period compensation coefficient for the channel to be calibrated for each specified period according to the calibration response sequence and the calibration sequence; and calculating an average period compensation coefficient for the channel to be calibrated, to obtain the compensation coefficient for the channel to be calibrated. A length or period of the calibration sequence may be flexibly adjusted according to actual requirements; and the specified period may be set according to actual requirements, and may include all periods, or a part of periods selected from all periods, which are not limited in the present application.

Since the period compensation coefficient is calculated for each specified period, and the compensation coefficient for the channel to be calibrated is determined according to an average value of a plurality of period compensation coefficients, it is equivalent to performing calibration operations for multiple times in one calibration process, thereby effectively improving the calibration accuracy.

At operation S504, calibrating the channel to be calibrated according to the compensation coefficient for the channel to be calibrated.

In some implementations, for each channel to be calibrated, the antenna calibration apparatus compensates the signal received by the channel to be calibrated or the signal transmitted from the channel to be calibrated according to the compensation coefficient for the channel to be calibrated, so as to ensure that all channels to be calibrated have consistent communication characteristics, and implement calibration of the channel to be calibrated.

In this embodiment, a calibration sequence of the channel to be calibrated is firstly generated, so that it is not necessary to obtain the calibration sequence through other functional entities, which can reduce interaction with other functional entities and simplify the calibration procedure; and according to obtained calibration configuration information of the channel to be calibrated and an output sequence of the channel to be calibrated, a calibration response sequence of the channel to be calibrated with higher accuracy can be obtained. Therefore, when determining the compensation coefficient for the channel to be calibrated according to the calibration response sequence of the channel to be calibrated and the calibration sequence of the channel to be calibrated, a more accurate compensation coefficient can be obtained so that when the channel to be calibrated is calibrated according to the compensation coefficient for the channel to be calibrated, a higher calibration accuracy can be obtained, and thereby the overall calibration accuracy of the antenna is improved.

Figure 6:
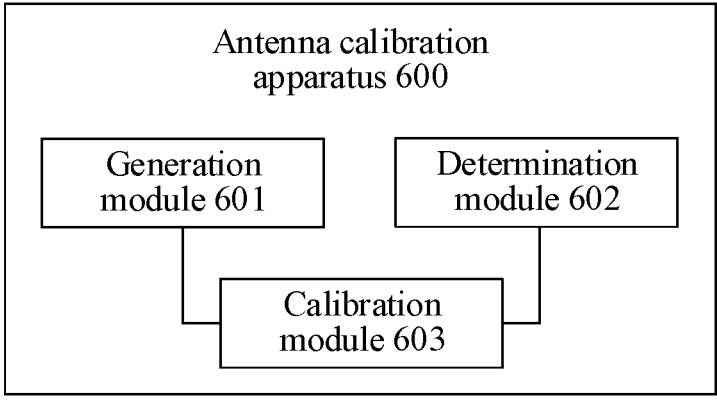
FIG. 6 shows a schematic block diagram of an antenna calibration apparatus according to an embodiment of the present application.

FIG. 6 shows a schematic block diagram of an antenna calibration apparatus according to an embodiment of the present application. As shown in FIG. 6, the antenna calibration apparatus 600 includes a generation module 601, a determination module 602, and a calibration module 603.

The generation module 601 is configured to generate a calibration sequence of a channel to be calibrated.

The determination module 602 is configured to determine, according to obtained calibration configuration information of the channel to be calibrated and an output sequence of the channel to be calibrated, a calibration response sequence of the channel to be calibrated.

The calibration configuration information of the channel to be calibrated includes phase information of a GP and delay information. The phase information of the GP is used to characterize an interval between a head position of the GP and a header of a data frame, and the delay information is used to characterize an interval between the calibration sequence of the channel to be calibrated and the head position of the GP. The output sequence of the channel to be calibrated is a sequence obtained through the channel to be calibrated in response to an input sequence of the channel to be calibrated, and the calibration response sequence is a sequence obtained through the channel to be calibrated in response to the calibration sequence of the channel to be calibrated.

In some implementations, the determination module 602 includes a position determination unit and a sequence acquisition unit. The position determination unit is configured to determine an initial acquisition position according to the phase information of the GP and the delay information. The initial acquisition position corresponds to a start position of the calibration response sequence in the GP. The sequence acquisition unit is configured to acquire the output sequence of the channel to be calibrated according to the initial acquisition position, to obtain a calibration response sequence of the channel to be calibrated.

The calibration module 603 is configured to calibrate the channel to be calibrated according to the calibration response sequence of the channel to be calibrated and the calibration sequence of the channel to be calibrated.

In some implementations, the calibration module 603 includes a compensation determination unit and a compensation calibration unit. The compensation determination unit is configured to obtain a compensation coefficient for the channel to be calibrated according to the calibration response sequence of the channel to be calibrated and the calibration sequence of the channel to be calibrated; and the compensation calibration unit is configured to calibrate the channel to be calibrated according to the compensation coefficient for the channel to be calibrated.

In some implementations, the compensation determination unit includes an estimation subunit, a weight obtaining subunit, and a compensation coefficient determination subunit. The estimation subunit is configured to perform channel estimation on the channel to be calibrated according to the calibration response sequence of the channel to be calibrated and the calibration sequence of the channel to be calibrated, to obtain impact response information of the channel to be calibrated: the weight obtaining subunit is configured to obtain an antenna weight of the channel to be calibrated according to the impact response information of the channel to be calibrated; and the compensation coefficient determination subunit is configured to determine a compensation coefficient for the channel to be calibrated according to the antenna weight of the channel to be calibrated and an antenna weight of a preset standard reference channel.

In some other implementations, under the condition that the calibration sequence is a periodic sequence, and the calibration response sequence is a periodic sequence having the same period as the calibration sequence, the compensation determination unit includes a first calculation subunit and a second calculation subunit. The first calculation subunit is configured to calculate a period compensation coefficient for the channel to be calibrated for each specified period according to the calibration response sequence and the calibration sequence; and the second calculation subunit is configured to calculate an average period compensation coefficient for the channel to be calibrated, to obtain the compensation coefficient for the channel to be calibrated.

In this embodiment, the generation module generates a calibration sequence of the channel to be calibrated, so that it is not necessary to obtain the calibration sequence through other functional entities, which can reduce interaction with other functional entities and simplify the calibration procedure; and according to obtained calibration configuration information of the channel to be calibrated and an output sequence of the channel to be calibrated, the determination module can obtain a calibration response sequence of the channel to be calibrated with higher accuracy. Therefore, when the calibration module calibrates the channel to be calibrated according to the calibration response sequence of the channel to be calibrated and the calibration sequence of the channel to be calibrated, the calibration accuracy of the channel to be calibrated can be effectively improved, and thereby the overall calibration accuracy of the antenna is improved.

An embodiment of the present application provides another possible implementation, in which the antenna calibration apparatus 600 further includes: an obtaining module and a processing module. The obtaining module is configured to obtain, under the condition of obtaining the output sequence of the channel to be calibrated according to the initial acquisition position, information of an attenuation factor of a variable gain amplifier (VGA) at an acquisition moment; and a processing module configured to suspend, under the condition that the VGA is determined to be abnormal according to the information of the attenuation factor, an acquisition operation on the output sequence of the channel to be calibrated, and acquire, under the condition that the VGA is determined to be recovered to normal, the output sequence of the channel to be calibrated again according to the calibration configuration information of the channel to be calibrated.

In some implementations, the antenna calibration apparatus 600 further includes: a fault handling module configured to: determine, according to the information of the attenuation factor, a calibration response sequence of the channel to be calibrated acquired during a period when the VGA is abnormal; and set the calibration response sequence of the channel to be calibrated acquired during the period when the VGA is abnormal in the preset storage space to an invalid state.

In some implementations, the antenna calibration apparatus 600 further includes: a sequence obtaining module configured to obtain from the preset storage space calibration response sequences of the channel to be calibrated except that in the invalid state.

Figure 7:
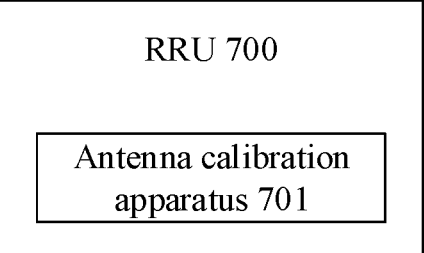
FIG. 7 shows a schematic block diagram of a remote radio unit according to an embodiment of the present application.

FIG. 7 shows a schematic block diagram of a remote radio unit according to an embodiment of the present application. As shown in FIG. 7, a remote radio unit 700 includes: at least one antenna calibration apparatus 701.

In some implementations, the antenna calibration apparatus 701 includes a generation module, a determination module, and a calibration module. The generation module is configured to generate a calibration sequence of a channel to be calibrated: the determination module is configured to determine, according to obtained calibration configuration information of the channel to be calibrated and an output sequence of the channel to be calibrated, a calibration response sequence of the channel to be calibrated; and the calibration module is configured to calibrate the channel to be calibrated according to the calibration response sequence of the channel to be calibrated and the calibration sequence of the channel to be calibrated.

It should be noted that the remote radio unit (RRU) is typically located on top of a communication signal tower, close to the antenna, so that the RRU may be communicated with the antenna by using a short radio frequency line (jumper). Therefore, the antenna calibration apparatus may be disposed inside the RRU, which results in a relatively short time delay in the antenna calibration process, as well as simpler and more convenient operations.

Figure 8:
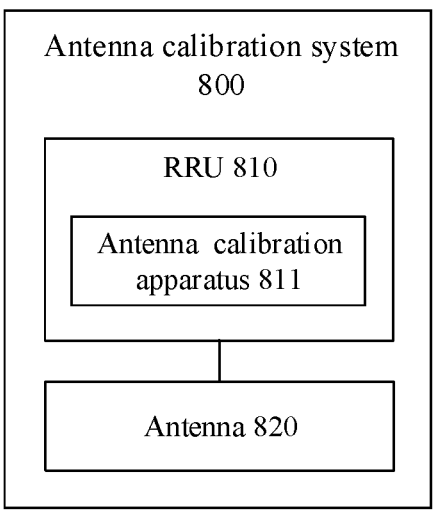
FIG. 8 shows a schematic block diagram of an antenna calibration system according to an embodiment of the present application.

FIG. 8 shows a schematic block diagram of an antenna calibration system according to an embodiment of the present application. As shown in FIG. 8, the antenna calibration system 800 includes: a remote radio unit 810 and an antenna 820. The remote radio unit 810 includes at least one antenna calibration apparatus 811, and the antenna includes a plurality of channels to be calibrated.

In some implementations, the antenna calibration apparatus 811 includes a generation module, a determination module, and a calibration module. The generation module is configured to generate a calibration sequence of the channels to be calibrated; the determination module is configured to determine, according to obtained calibration configuration information of the channels to be calibrated and output sequences of the channels to be calibrated, calibration response sequences of the channels to be calibrated; and the calibration module is configured to calibrate the channels to be calibrated according to the calibration response sequences of the channels to be calibrated and the calibration sequence of the channels to be calibrated.

Figure 9:
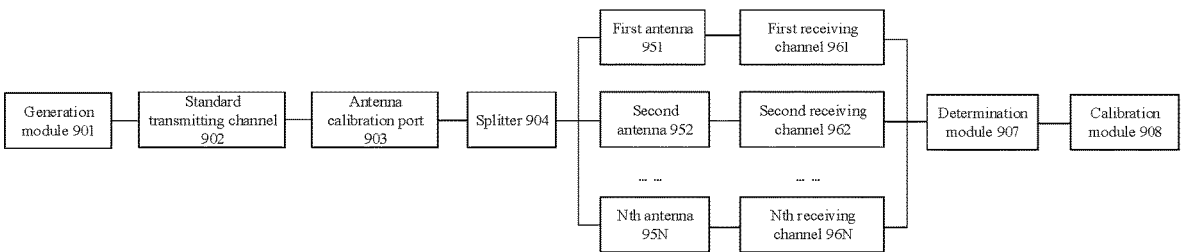
FIG. 9 shows a schematic block diagram of uplink calibration by an antenna calibration system according to an embodiment of the present application.

FIG. 9 shows a schematic block diagram of uplink calibration by an antenna calibration system according to an embodiment of the present application.

As shown in FIG. 9, in an uplink calibration process, the calibration is performed mainly on receiving channels of the antenna in a "one-transmitting multiple-receiving" mode. Channels to be calibrated include a first receiving channel 961, a second receiving channel 962 to an $n^{th}$ receiving channel 96N (where N is a positive integer greater than 1), and an antenna calibration module includes a generation module 901, a determination module 907, and a calibration module 908.

In this embodiment, the antenna calibration apparatus generates a calibration sequence by the generation module 901, and transmits the calibration sequence to a standard transmitting channel 902. A signal processing apparatus (not shown) in the standard transmitting channel 902 generates an input sequence from the calibration sequence and preset delay configuration information. The standard transmitting channel 902 transmits the input sequence, through a channel link thereof, to an antenna calibration port 903. The antenna calibration port 903 sends the input sequence to a splitter 904 which distributes the input sequence to the first to the $n^{th}$ antennae 951 to 95N with "equal differential loss" and "equal phase shift". The first, the second to the $n^{th}$ receiving channels 961, 962 to 96N (i.e., the channels to be calibrated) receive the input sequence, and obtain their respective output sequences through transmission. For each channel to be calibrated, the antenna calibration apparatus obtains calibration configuration information of the channel to be calibrated from the standard transmitting channel, the determination module 907 acquires a calibration response sequence of the channel to be calibrated from the output sequence of the channel to be calibrated according to the calibration configuration information, and the calibration module 908 calibrates the channel to be calibrated according to the calibration response sequence of the channel to be calibrated and the calibration sequence of the channel to be calibrated.

Figure 10:
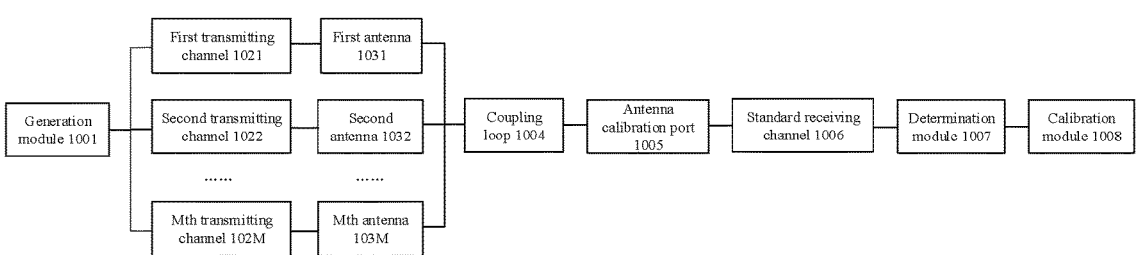
FIG. 10 shows a schematic block diagram of downlink calibration by an antenna calibration system according to an embodiment of the present application.

FIG. 10 shows a schematic block diagram of downlink calibration by an antenna calibration system according to an embodiment of the present application.

As shown in FIG. 10, in a downlink calibration process, the calibration is performed mainly on transmitting channels of the antenna in a "multi-transmitting one-receiving" mode. Channels to be calibrated include a first transmitting channel 1021, a second transmitting channel 1022 to an $M^{th}$ transmitting channel 102M (where M is a positive integer greater than 1), and an antenna calibration module includes a generation module 1001, a determination module 1007, and a calibration module 1008.

In this embodiment, the antenna calibration apparatus generates a calibration sequence by the generation module 1001, and transmits the calibration sequence to the first, the second to the $M^{th}$ transmission channels 1021, 1022 to 102M (i.e., the channels to be calibrated). A signal processing apparatus (not shown) in each channel to be calibrated generates, according to the calibration sequence and preset delay configuration information, an input sequence by inserting the calibration sequence into a GP, and transmits the input sequence of the channel to be calibrated through the channel link of the channel to be calibrated to obtain an output sequence of the channel to be calibrated. A first antenna 1031, a second antenna 1032 to an $M^{th}$ antenna 103M transmit their respective output sequences to a coupling loop 1004. The coupling loop 1004 couples the output sequences of all channels to be calibrated to an antenna calibration port 1005 with "equal differential loss" and "equal phase shift", and the antenna calibration port 1005 transmits the output sequences of all channels to be calibrated to a standard receiving channel 1006. The standard receiving channel 1006 receives the output sequences of all channels to be calibrated to obtain a mixed sequence. The antenna calibration apparatus obtains the mixed sequence through the standard receiving channel 1006. Before calibration, the antenna calibration apparatus needs to separate the output sequences of the respective channels to be calibrated from the mixed sequence. For each channel to be calibrated, the antenna calibration apparatus obtains calibration configuration information of the channel to be calibrated from the channel to be calibrated, the determination module 1007 determines, according to the calibration configuration information and the output sequence of the channel to be calibrated, a calibration response sequence of the channel to be calibrated, and the calibration module 1008 calibrates the channel to be calibrated according to the calibration response sequence of the channel to be calibrated and the calibration sequence of the channel to be calibrated.

It should be noted that in the downlink calibration, the calibration efficiency and inter-antenna interference should both be considered, and therefore, the calibration may be performed in an antenna group alternate-transmitting mode (e.g., 8 antennae are provided in each antenna group, and perform transmission alternately for calibration).

Figure 11:
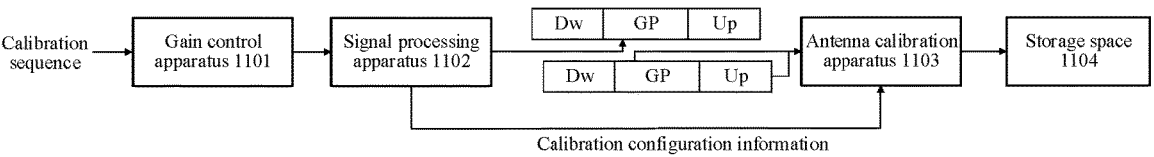
FIG. 11 shows a schematic diagram of an antenna calibration process according to an embodiment of the present application.

FIG. 11 shows a schematic diagram of an antenna calibration process according to an embodiment of the present application.

As shown in FIG. 11, a gain control apparatus 1101 and a signal processing apparatus 1102 are located at a downlink portion and configured to transmit a signal to an uplink: an antenna calibration apparatus 1103 is located at a uplink portion, and configured to receive the signal transmitted from the downlink and perform a calibration operation according to the signal.

In some implementations, the gain control apparatus 1101 obtains the calibration sequence generated by the antenna calibration apparatus 1103, processes the gain of the calibration sequence under the action of a gain factor, and sends the processed calibration sequence to the signal processing apparatus 1102 (e.g., a read-write control/timing conversion apparatus). The signal processing apparatus 1102 inserts the calibration sequence into a GP of a data frame according to preset delay configuration information, and sends the data frame to the uplink while sending the calibration configuration information to the antenna calibration apparatus 1103. The antenna calibration apparatus 1103 receives the data frame, and acquires a calibration response sequence from the GP according to the calibration configuration information, and stores the acquired calibration response sequence in a storage space 1104. When performing calibration, the antenna calibration apparatus 1103 may obtain the calibration response sequence from the storage space 1104 to perform antenna calibration.

In this embodiment, the uplink and downlink synchronization in the antenna calibration process is guaranteed through the calibration configuration information, and a relatively accurate calibration response sequence is obtained, thereby effectively improving the calibration accuracy.

Figure 12:
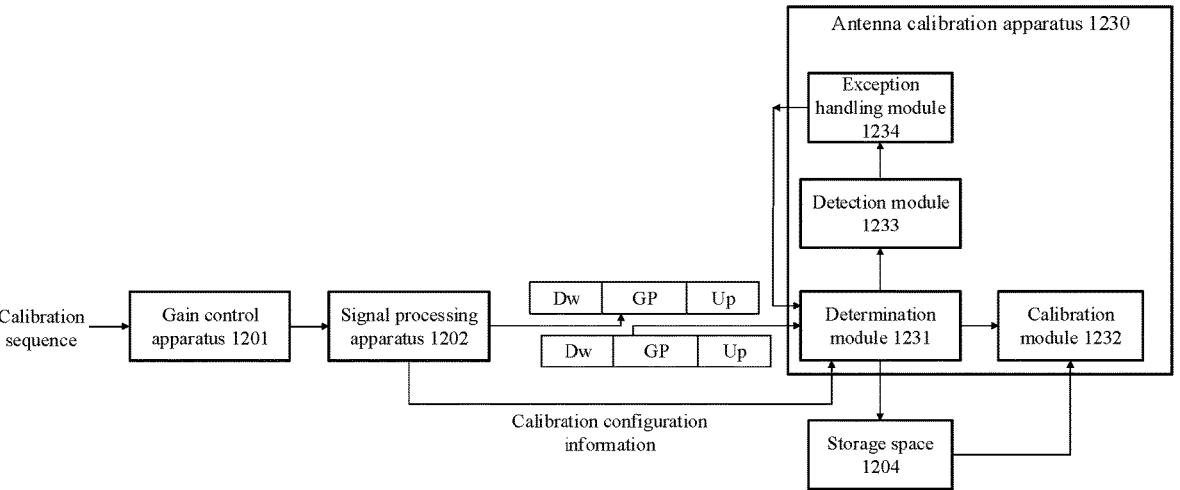
FIG. 12 shows a schematic diagram of an antenna calibration process according to another embodiment of the present application.

FIG. 12 shows a schematic diagram of an antenna calibration process according to another embodiment of the present application.

As shown in FIG. 12, a gain control apparatus 1201 and a signal processing apparatus 1202 are located at a downlink portion and configured to transmit a signal to an uplink: an antenna calibration apparatus 1230 is located at a uplink portion, and configured to receive the signal transmitted from the downlink and perform a calibration operation according to the signal. The antenna calibration apparatus 1230 includes a determination module 1231, a calibration module 1232, a detection module 1233, and an exception handling module 1234.

In some implementations, the gain control apparatus 1201 obtains the calibration sequence generated by the antenna calibration apparatus 1230, processes a gain of the calibration sequence under the action of a gain factor, and sends the processed calibration sequence to the signal processing apparatus 1202 (e.g., a read-write control/timing conversion apparatus). The signal processing apparatus 1202 inserts the calibration sequence into a GP of a data frame according to preset delay configuration information, and sends the data frame to the uplink while sending the calibration configuration information to the determination module 1231. The determination module 1231 acquires a calibration response sequence from the GP of the data frame according to the calibration configuration information, and stores the calibration response sequence in the storage space 1204. While the determination module 1231 acquires the calibration response sequence, the detection module 1233 detects and caches a VGA attenuation factor at the acquisition moment, and sends, upon determining that the VGA attenuation factor has a fault, a prompt message to the exception handling module 1234. The exception handling module 1234, after receiving the prompt message and learning that the VGA attenuation factor is abnormal, issues a relevant instruction to the determination module 1231 so that the determination module 1231, instead of continuing the previous acquisition operation, starts a new calibration response sequence acquisition process according to the calibration configuration information. In addition, a calibration response sequence acquired when the VGA is abnormal is set to an invalid state in the storage space 1204, and during calibration, the calibration module 1232 obtains a valid calibration response sequence from the storage space 1204 for antenna calibration.

Figure 13:
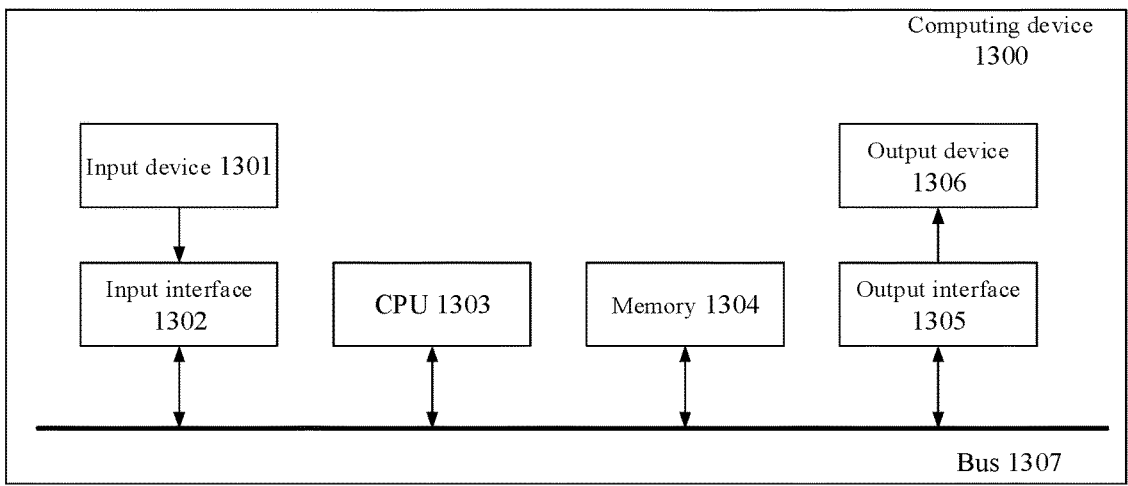
FIG. 13 shows a block diagram of an exemplary hardware architecture of a computing device capable of implementing the antenna calibration method and apparatus according to an embodiment of the present disclosure.

FIG. 13 shows a block diagram of an exemplary hardware architecture of a computing device capable of implementing the antenna calibration method and apparatus according to an embodiment of the present disclosure.

As shown in FIG. 13, the computing device 1300 includes an input device 1301, an input interface 1302, a central processing unit 1303, a memory 1304, an output interface 1305, and an output device 1306. The input interface 1302, the central processing unit 1303, the memory 1304, and the output interface 1305 are connected to each other via a bus 1307, and the input device 1301 and the output device 1306 are connected to the bus 1307 via the input interface 1302 and the output interface 1305, respectively, and further connected to other components of the computing device 1300.

Specifically, the input device 1301 receives input information from the outside, and transmits the input information to the central processing unit 1303 through the input interface 1302: the central processing unit 1303 processes the input information based on computer-executable instructions stored in the memory 1304 to generate output information, stores the output information temporarily or permanently on the memory 1304, and then transmits the output information to the output device 1306 through the output interface 1305; and the output device 1306 outputs the output information outside of the computing device 1300 for use by a user.

In one implementation, the computing device shown in FIG. 13 may be implemented as an electronic device, including: a memory configured to store a program; and a processor configured to execute the program stored in the memory to perform the antenna calibration method described in any of the above embodiments.

In one implementation, the computing device shown in FIG. 13 may be implemented as an antenna calibration system, including: a memory configured to store a program; and a processor configured to execute the program stored in the memory to perform the antenna calibration method described in any of the above embodiments.

The above are merely exemplary embodiments/implementations of the present application and not intended to limit the scope of the present application. In general, the various embodiments/implementations of the present application may be implemented in hardware or dedicated circuits, software, logic or any combination thereof. For example, some aspects may be implemented in hardware, while other aspects may be implemented in firmware or software which may be executed by a controller, a microprocessor or any other computing device, although the present application is not limited thereto.

Embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcodes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable storage medium may include a non-transitory computer-readable storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of embodiments/implementations of the present application. Various modifications and adaptations to the foregoing embodiments/implementations may become apparent to those skilled in the art in view of the accompanying drawings and the appended claims, without departing from the scope of the present disclosure. Accordingly, the proper scope of the present application is to be determined according to the claims.

What is claimed is:

1. An antenna calibration method, comprising:

generating a calibration sequence of a channel to be calibrated;

determining, according to obtained calibration configuration information of the channel to be calibrated and an output sequence of the channel to be calibrated, a calibration response sequence of the channel to be calibrated, wherein the output sequence of the channel to be calibrated is a sequence obtained through the channel to be calibrated in response to an input sequence; and calibrating the channel to be calibrated according to the calibration response sequence of the channel to be calibrated and the calibration sequence of the channel to be calibrated, wherein the input sequence of the channel to be calibrated is a sequence obtained by a signal processing apparatus inserting the calibration sequence of the channel to be calibrated into a guard period (GP) of a data frame according to preset delay configuration information; and wherein the calibration configuration information comprises phase information of the GP and delay information, the phase information of the GP is used to characterize an interval between a head position of the GP and a header of a data frame, and the delay information is used to characterize an interval between the calibration sequence of the channel to be calibrated and the head position of the GP.

2. The antenna calibration method according to claim 1, wherein determining, according to the obtained calibration configuration information of the channel to be calibrated and the output sequence of the channel to be calibrated, the calibration response sequence of the channel to be calibrated comprises:

determining an initial acquisition position according to the phase information of the GP and the delay information, wherein the initial acquisition position corresponds to a start position of the calibration response sequence in the GP; and acquiring the output sequence of the channel to be calibrated according to the initial acquisition position, to obtain a calibration response sequence of the channel to be calibrated.

3. The antenna calibration method according to claim 2, wherein before determining the initial acquisition position according to the phase information of the GP and the delay information, the method further comprises:

separating, under a condition that the channel to be calibrated is transmitting channels of an antenna, the output sequence of each channel to be calibrated from a mixed sequence, wherein the mixed sequence is a sequence set which is received by a standard receiving channel and comprises output sequences of a plurality of channels to be calibrated.

4. The antenna calibration method according to claim 2, wherein after determining the initial acquisition position according to the phase information of the GP and the delay information, the method further comprises:

obtaining, under a condition of obtaining the output sequence of the channel to be calibrated according to the initial acquisition position, information of an attenuation factor of a variable gain amplifier (VGA) at an acquisition moment; and suspending, under a condition that the VGA is determined to be abnormal according to the information of the attenuation factor, an acquisition operation on the output sequence of the channel to be calibrated.

5. The method according to claim 4, wherein after suspending the acquisition operation on the output sequence of the channel to be calibrated, the method further comprises:

acquiring, under a condition that the VGA is determined to be recovered to normal, the output sequence of the channel to be calibrated again according to the calibration configuration information of the channel to be calibrated.

6. The antenna calibration method according to claim 4, wherein after obtaining, under the condition of obtaining the output sequence of the channel to be calibrated according to the initial acquisition position, information of the attenuation factor of the VGA at the acquisition moment, the method further comprises:

storing into a preset storage space the information of the attenuation factor, as well as the calibration response sequence of the channel to be calibrated acquired at the acquisition moment and corresponding to the information of the attenuation factor.

7. The antenna calibration method according to claim 6, wherein after suspending the acquisition operation on the output sequence of the channel to be calibrated, the method further comprises:

determining, according to the information of the attenuation factor, a calibration response sequence of the channel to be calibrated acquired during a period when the VGA is abnormal; and setting the calibration response sequence of the channel to be calibrated acquired during the period when the VGA is abnormal in the preset storage space to an invalid state.

8. The antenna calibration method according to claim 7, wherein before calibrating the channel to be calibrated according to the calibration response sequence of the channel to be calibrated and the calibration sequence of the channel to be calibrated, the method further comprises:

obtaining from the preset storage space calibration response sequences of the channel to be calibrated except that in the invalid state.

9. The antenna calibration method according to claim 1, wherein calibrating the channel to be calibrated according to the calibration response sequence of the channel to be calibrated and the calibration sequence of the channel to be calibrated comprises:

obtaining a compensation coefficient for the channel to be calibrated according to the calibration response sequence of the channel to be calibrated and the calibration sequence of the channel to be calibrated; and calibrating the channel to be calibrated according to the compensation coefficient for the channel to be calibrated.

10. The antenna calibration method according to claim 9, wherein obtaining the compensation coefficient for the channel to be calibrated according to the calibration response sequence of the channel to be calibrated and the calibration sequence of the channel to be calibrated comprises:

performing channel estimation on the channel to be calibrated according to the calibration response sequence of the channel to be calibrated and the calibration sequence of the channel to be calibrated, to obtain impact response information of the channel to be calibrated;

obtaining an antenna weight of the channel to be calibrated according to the impact response information of the channel to be calibrated; and

determining a compensation coefficient for the channel to be calibrated according to the antenna weight of the channel to be calibrated and an antenna weight of a preset standard reference channel.

11. The antenna calibration method according to claim 10, wherein the preset standard reference channel is a channel selected from a plurality of channels to be calibrated.

12. The antenna calibration method according to claim 9, wherein the calibration sequence is a periodic sequence, and the calibration response sequence is a periodic sequence having the same period as the calibration sequence; and obtaining the compensation coefficient for the channel to be calibrated according to the calibration response sequence of the channel to be calibrated and the calibration sequence of the channel to be calibrated comprises:

calculating a period compensation coefficient for the channel to be calibrated for each specified period according to the calibration response sequence and the calibration sequence; and calculating an average period compensation coefficient for the channel to be calibrated, to obtain the compensation coefficient for the channel to be calibrated.

13. The antenna calibration method according to claim 1, wherein the channel to be calibrated comprises a transmitting channel and a receiving channel;

under a condition that the channel to be calibrated is a transmitting channel, a signal processing apparatus sends the input sequence of the channel to be calibrated to the channel to be calibrated, and the channel to be calibrated receives and transmits the input sequence of the channel to be calibrated, and sends the output sequence of the channel to be calibrated to a standard receiving channel through a coupling loop; and under a condition that the channel to be calibrated is a receiving channel, the signal processing apparatus sends the input sequence of the channel to be calibrated to a standard transmitting channel, and the standard transmitting channel sends the input sequence of the channel to be calibrated to the channel to be calibrated through a splitter, and the channel to be calibrated receives and transmits the input sequence of the channel to be calibrated to obtain the input sequence of the channel to be calibrated;

wherein the standard receiving channel is a channel selected from receiving channels of the antenna, and wherein the standard transmitting channel is a channel selected from transmitting channels of the antenna.

14. The antenna calibration method according to claim 13, wherein under a condition that the channel to be calibrated is a transmitting channel of the antenna, the output sequence of the channel to be calibrated is obtained from the standard receiving channel; and under a condition that the channel to be calibrated is a receiving channel of the antenna, the output sequence of the channel to be calibrated is obtained from the channel to be calibrated.

15. An antenna calibration apparatus, comprising:

a generation module configured to generate a calibration sequence of a channel to be calibrated;

a determination module configured to determine, according to obtained calibration configuration information of the channel to be calibrated and an output sequence of the channel to be calibrated, a calibration response sequence of the channel to be calibrated, wherein the output sequence of the channel to be calibrated is a sequence obtained through the channel to be calibrated in response to an input sequence of the channel to be calibrated; and a calibration module configured to calibrate the channel to be calibrated according to the calibration response sequence of the channel to be calibrated and the calibration sequence of the channel to be calibrated, wherein the input sequence of the channel to be calibrated is a sequence obtained by the signal processing apparatus inserting the calibration sequence of the channel to be calibrated into a guard period (GP) of a data frame according to preset delay configuration information; and wherein the calibration configuration information comprises phase information of the GP and delay information, the phase information of the GP is used to characterize an interval between a head position of the GP and a header of a data frame, and the delay information is used to characterize an interval between the calibration sequence of the channel to be calibrated and the head position of the GP.

16. A remote radio unit (RRU), comprising:

at least one antenna calibration apparatus according to claim 15.

17. An antenna calibration system, comprising: a remote radio unit (RRU) and an antenna;

wherein the RRU adopts the RRU according to claim 16; and the antenna comprises a plurality of channels to be calibrated.

18. A non-transitory computer-readable storage medium, wherein the readable storage medium has a computer program stored thereon which, when executed by a processor, causes the antenna calibration method according to claim 1 to be implemented.

\* \* \* \* \*